Feb. 16, 1965  P. E. STREIGLE  3,169,891
RESERVE ENERGIZED BATTERY
Filed Feb. 13, 1963  2 Sheets-Sheet 1

INVENTOR.
PAUL E. STREIGLE
BY
Brown, Critchlow, Flick & Peckham.
ATTORNEYS.

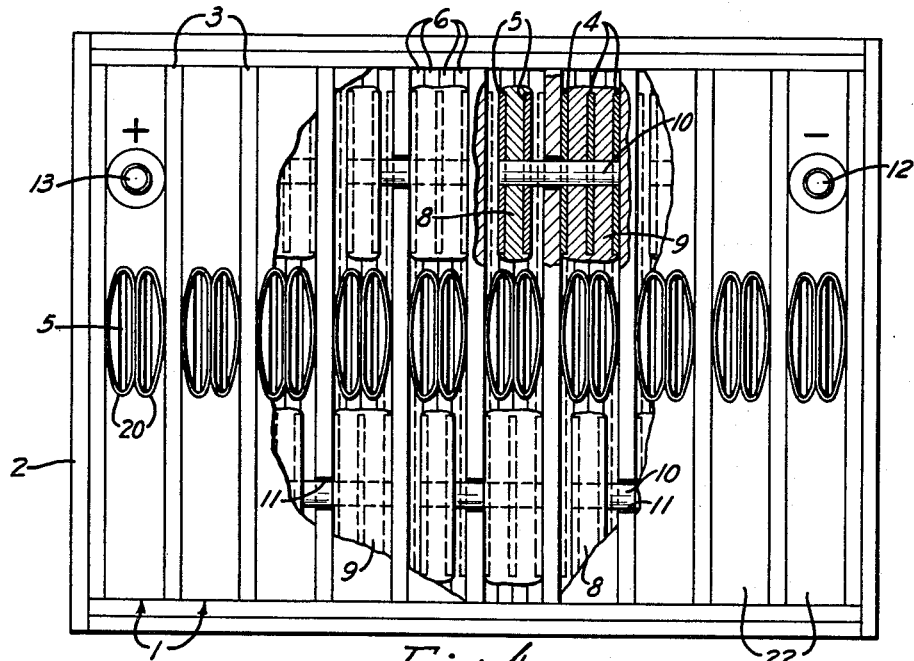
Fig. 4
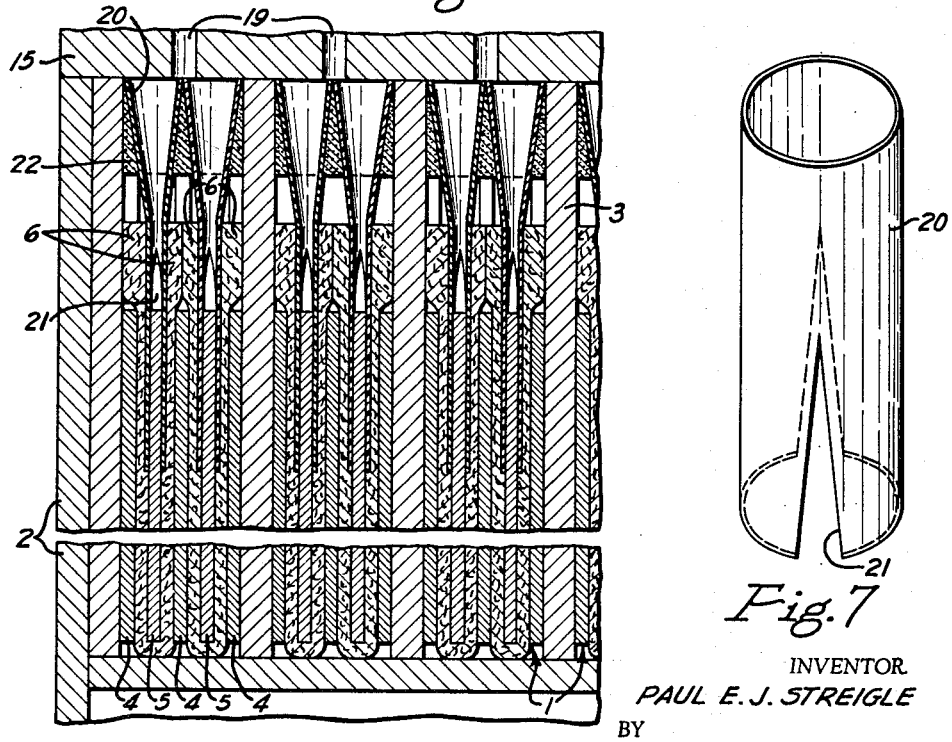
Fig. 5
Fig. 7
INVENTOR.
PAUL E. J. STREIGLE
BY
Brown, Critchlow, Flick & Peckham.
ATTORNEYS.

United States Patent Office 3,169,891
Patented Feb. 16, 1965

3,169,891
RESERVE ENERGIZED BATTERY
Paul E. Streigle, Westminster, Md., assignor to Catalyst Research Corporation, Baltimore, Md., a corporation of Maryland
Filed Feb. 13, 1963, Ser. No. 258,303
6 Claims. (Cl. 136—90)

This invention relates to wet cell batteries that are maintained dry until ready for use, and more particularly to the manner in which electrolyte is introduced into them.

One type of wet cell battery, called a reserve energy battery, is not supplied with the electrolyte until immediately prior to use. The electrolyte may be poured into the battery manually or it may be forced into it automatically. In the latter case especially, it often is highly desirable that the battery be activated in the shortest possible time when the electrolyte is delivered to it, but heretofore the entering electrolyte has not distributed itself uniformly over the battery plates as quickly as desired, whereby there has been a delay before the desired electrical energy could be obtained from the battery.

It is among the objects of this invention to provide a reserve energized battery, which is energized practically at the moment the electrolyte is introduced into it, and which contains a simple and inexpensive distribution system for the electrolyte to bring about such a result.

In accordance with this invention a battery cell or a number of cells, depending on the size of the battery, has an odd number of vertical electrode plates disposed side by side in a row. Between the plates there are the usual absorbent separators. In order to rapidly and completely distribute an electrolyte over the sides of the plates when it is delivered to the cell, one or more funnels are disposed at the top of the cell, each one above a different plate in the row. Each funnel is provided with a bifurcated lower end portion that straddles the upper central portion of the underlying plate. The lower portion of the funnel engages the opposite sides of that plate. When electrolyte is poured or forced into the funnel, it is conducted directly to the opposite sides of the plate that is straddled by the funnel and immediately spreads out over the plate and the plate or plates beside the straddle plate.

Figure 1:
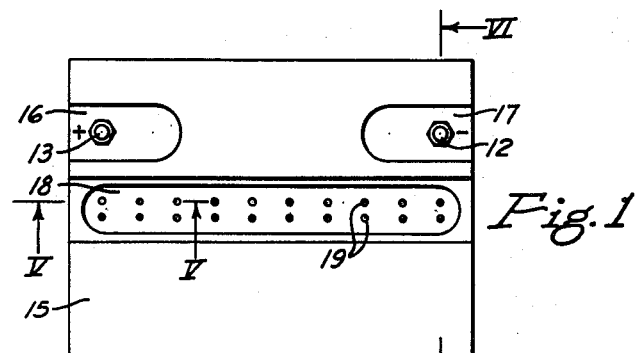
Figure 2:
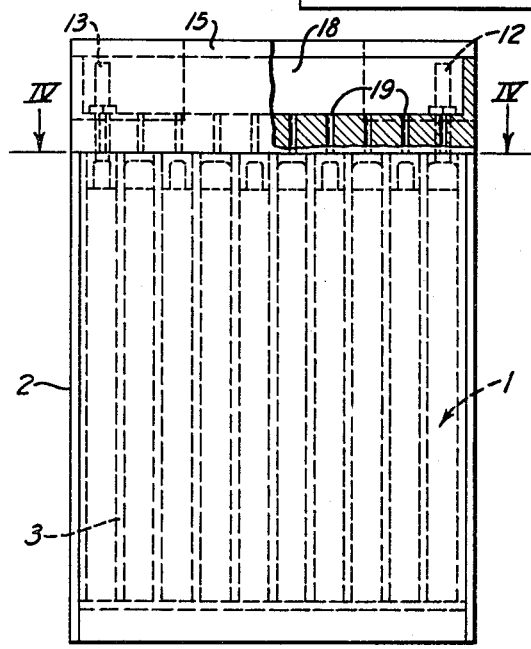
Figure 3:
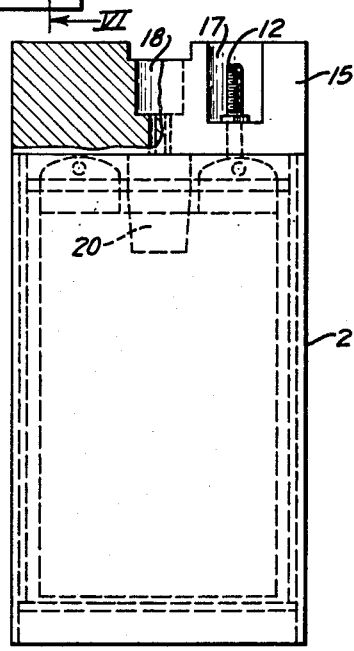
Figure 6:
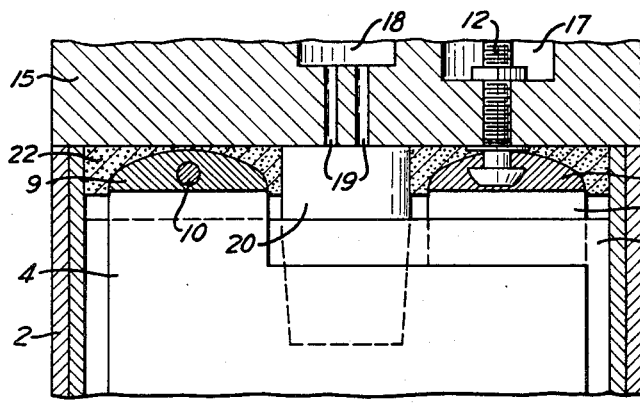

The preferred embodiment of the invention is illustrated in the acmompanying drawings, in which:

FIG. 1 is a plan view of my battery;
FIG. 2 is a side view of the battery, with the cover partly broken away;
FIG. 3 is an end view with part of the cover broken away;
FIG. 4 is an enlarged plan view of the cell section of the battery, with parts broken away;
FIGS. 5 and 6 are enlarged fragmentary vertical sections taken on the lines V—V and VI—VI, respectively, of FIG. 1; and
FIG. 7 is an enlarged perspective view of one of the funnels in an intermediate stage of its formation.

Referring to the drawings, the battery may be formed from any number of cells 1 from one to a large number disposed side by side. The battery illustrated happens to have ten cells. These cells are formed in a rectangular cell case 2 containing a plurality of laterally spaced vertical insulating partitions 3. Each pair of adjacent partitions defines a different cell. Each of the cells includes an odd number of vertical electrode plates disposed in a row with absorbent separators between them. As shown in FIG. 5, a typical cell is formed from three zinc electrode plates 4 and two silver oxide electrode plates 5 alternating with one another, although there could be two zinc plates and three silver oxide plates. The separators 6 preferably are formed from two sheets of soft fibrous material, each doubled on itself around the bottom of a silver oxide plate to form two separators that extend above the tops of the plates.

At one end of each cell the even number plates or silver oxide electrodes have upwardly projecting portions that are united by a body 8 of solder, as shown in FIGS. 4 and 6. At the opposite end of the cell the remaining three plates are likewise provided with upwardly projecting portions united by a body 9 of solder. The bodies of solder are reversed in each alternate cell so that the three plate projections at one end of a cell are between the pairs of plate projections of the two adjoining cells. Also, embedded in the solder body above the three plate projections in any given cell is a conductor pin 10 that extends through a vertical notch 11 (FIG. 4) in the side wall of the cell and into the adjoining cell, where the pin is embedded in the solder connecting only two of the electrode plates. Consequently, the conducting pins are staggered lengthwise of the battery. At one end of the battery the solder connecting the pair of silver oxide plates embeds the head of a threaded terminal 12 that extends upward out of the battery case as shown in FIGS. 1, 3, 4 and 6.

In the opposite end the head of a similar projecting terminal 13 (FIGS. 1 and 4) is embedded in the solder that connects the three zinc plates, whereby one of the terminals is negative and the other is positive.

Fastened tightly to the top of cell case 2 in any suitable manner is a manifold cover 15 provided at its opposite ends with recesses 16 and 17, up into which the two battery terminals extend as shown in FIG. 1. The central portion of the cover is provided with a longitudinally extending trough 18, having in its bottom a pair of vertical passages 19 above the center of each cell for delivery of an electrolyte to the cell. It is a feature of this invention that instead of letting the electrolyte merely pour into the open spaces at the top of the cells, the battery is provided with means for conducting the electrolyte directly from the lower ends of the manifold passages to certain of the underlying electrodes in a manner that will very rapidly wet all of the electrode surfaces. Accordingly, funnel-like elements 20 are located above the plates in each row of electrodes, each funnel having a bifurcated lower end portion that straddles the upper central portion of an underlying plate. The tops of the funnels tightly engage the bottom of cover 15. Although it would be possible to provide a funnel for every plate or to apply them to only odd number plates in each row, the greatest amount of distribution with the least number of funnels is obtained by applying the funnels to only the even number plates (the second and fourth) in a row. Preferably, as shown in FIG. 7, each funnel is formed from a short resilient tube made of a suitable plastic and provided at diametrically opposite points with a pair of tapered slots 21 that extend along the tube from one end. It is these slots that receive the plate that the funnel straddles, and the portions of the funnel between the notches is more or less flattened against the opposite sides of the plate by the pressure of the separators against them. The tube has a large enough diameter so that with two funnels side by side in each cell, their upper ends will be flattened into ovals because they are compressed by the side walls of the cell. The meeting upper edges of the funnels form a substantially straight line bisecting the lower ends of passages 19 as shown in FIGS. 4 and 5, so that both funnels can receive electrolyte simultaneously. The upper ends of the cells are sealed by suitable potting material 22 that embeds the funnels and completely surrounds them.

When the electrolyte is delivered to the trough 18 in the cover, it flows down through passages 19 into the different pairs of funnels. Each pair conducts the electrolyte directly to the upper edges of the silver oxide plates centrally thereof, where it flows along those edges and down the opposite sides of those plates to quickly wet them and the adjoining separators, which in turn wet the adjoining zinc plates. Thus, when the electrolyte is injected through the cover passages, it can be forced only into the funnels and by them conducted to the electrode plates straddled by them.

According to the provisions of the patent statutes, I have explained the principle of my invention and have illustrated and described what I now consider to represent its best embodiment. However, I desire to have it understood that, within the scope of the appended claims, the invention may be practiced otherwise than as specifically illustrated and described.

I claim:

1. A reserve energized battery cell comprising an odd number of vertical electrode plates disposed side by side in a row, absorbent separators between the plates, and an electrolyte-receiving funnel at the top of the cell provided with a bifurcated lower end portion straddling the upper central portion of a plate in said row, said funnel engaging the opposite sides of said plate.

2. A battery according to claim 1, in which said straddled plate is an even number plate in the row.

3. A battery according to claim 1, including potting material surrounding the upper portion of the funnel in engagement therewith and sealing the top of the cell.

4. A battery cell according to claim 1, in which there are five electrode plates in said row and two of said funnels, one funnel being mounted on the second plate in the row, and the other funnel being mounted on the fourth plate in the row.

5. A battery cell according to claim 1, in which said funnel is made from a short flexible tube provided in its lower portion with a pair of diametrically opposite vertical slots for receiving the upper end of said plate, the portions of the tube between said slots being flattened against the sides of the plate.

6. A reserve energized battery comprising a cell case and a cover for it, an odd number of vertical electrode plates disposed side by side in said case in a row, said row being formed from at least five of said plates, absorbent separators between the plates, means electrically connecting the upper ends of the even number plates in said row, means electrically connecting the upper ends of the odd number plates in said row, and a plurality of funnels in the upper part of said case having upper ends engaging the lower surface of said cover, each funnel having a bifurcated lower portion straddling the upper central portion of one of said even number plates in engagement with the opposite sides thereof, the upper ends of the funnels engaging each other along their adjoining edges and being flattened transversely, and said cover being provided with a vertical passage having a lower end straddling the underlying pair of adjoining funnel edges for delivering electrolyte to two funnels simultaneously.

References Cited in the file of this patent

UNITED STATES PATENTS

| 635,004 | Souder | Oct. 17, 1899 |
| 2,895,000 | Schwarz et al. | July 14, 1959 |
| 2,937,220 | Bauman | May 17, 1960 |
| 2,947,053 | Baldwin et al. | June 21, 1960 |